Jan. 5, 1965   J. M. OLIVER   3,164,272
CATALYST UNLOADING DEVICE
Filed Jan. 17, 1962
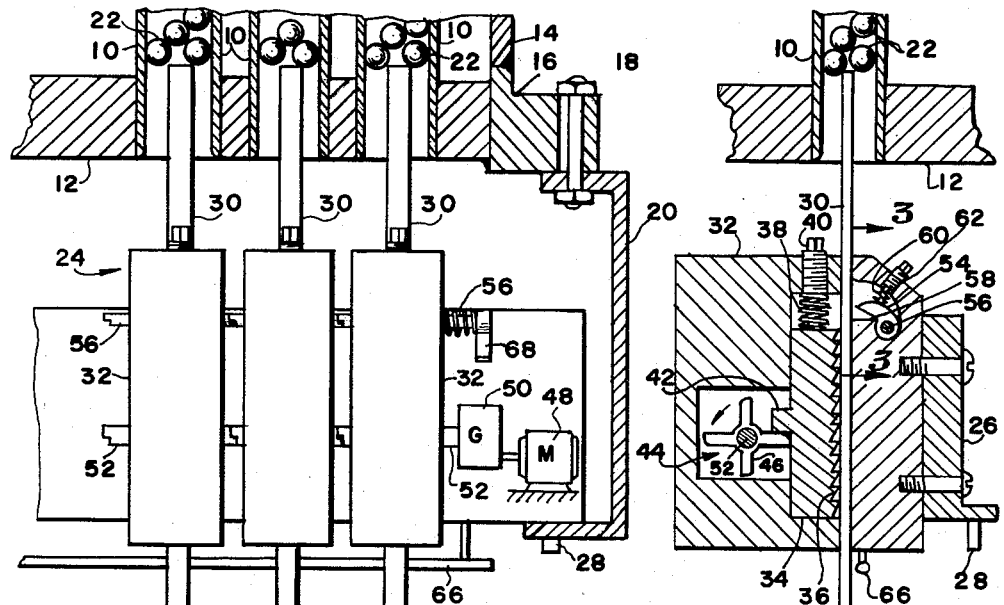
FIG.1.   FIG.2.
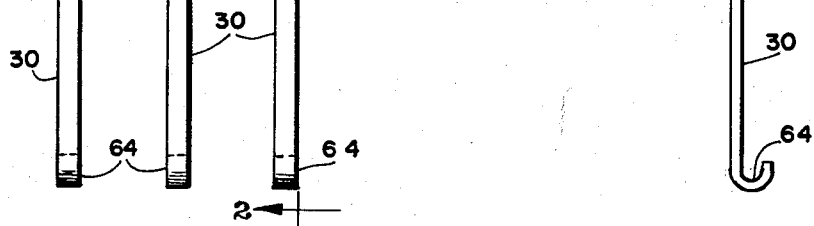
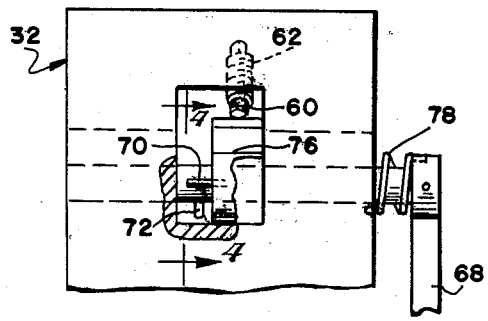
FIG.3.
INVENTOR.
JOHN M. OLIVER
BY
Cushman, Darby & Cushman
ATTORNEYS United States Patent Office 3,164,272
Patented Jan. 5, 1965

3,164,272
CATALYST UNLOADING DEVICE
John M. Oliver, Port Arthur, Tex., assignor to Houston Chemical Corporation, New York, N.Y., a corporation of Texas
Filed Jan. 17, 1962, Ser. No. 166,824
9 Claims. (Cl. 214—17)

This invention relates to a catalyst unloading device, and in particular to apparatus for removing catalyst particles from at least one reactor tube, especially to the removal of solid particle type catalysts from a plurality of reactor tubes.

Catalytic reactions are often carried out in multi-tube small diameter tube reactors, using a solid particle type of catalyst. Reference may be made to the copending Sacken and Young application Serial No. 173,089 filed February 9, 1962 for exemplary reactor tubes and loading of catalyst particles therein. To discharge these particles, when it is necessary that the catalysts be replaced, can be a difficult and costly procedure. This is particularly true when using catalyst particles which tend to "bridge" or wedge themselves across the diameter of the tube. Often this requires "snaking" or rodding out of the catalyst. Generally, the tubes are usually thin-walled to effect good heat transfer and reduce capital investment. Consequently, the rodding usually must be carried out with flexible strips which will not pierce or penetrate the tube walls in order to prevent costly repairs. Most generally, tubes are rodded out by a number of men standing underneath the reactor and shoving flexible strips up through the tubes to dislodge the catalyst particles. In some cases a man does well to rod out ten tubes per hour.

In accordance with the instant invention, any number of tubes, from 1 to 100, or even more, can be cleared of the catalyst particles each hour. Accordingly, many less man-hours are required, effecting a great saving. Preferably, the rodding means for each tube is a flat flexible strip of metal, for example of the type which is used to band drums or cartons.

Each strip of metal is fed by ratchet means into its respective tube. The ratchet means preferably includes a slidable bar which has serrated teeth positioned against the respective metal strip. These teeth are reciprocated, upwardly by a rotating multi-fingered mechanism and downwardly by spring means. Due to a releasable catch, the metal strip moves only upwardly into its respective tube. Means are provided to effect release of the catch, along with means to pull all of the metal strips down and out of their respective tubes. In operation, the serrated teeth push the metal strips upwardly, but not with so much pressure that there cannot be slippage between the teeth and the metal strip if the upper end of the metal strip is prevented, for one reason or another, from dislodging the catalyst particles. This prevents the upper end of the metal strips from possibly damaging the thin-walled reactor tubes.

Accordingly, it is an object of this invention to provide apparatus for removing catalyst particles from a reactor tube by means for slippably urging rodding means into and through the reactor tube.

Other objects and advantages of this invention will become apparent to those of ordinary skill in the art upon reading the following detailed description of an embodiment of the invention and the appended claims, in conjunction with the drawings, in which:

FIGURE 1 is a fragmentary front elevational view, partially in cross section, of the unloading apparatus and reactor tubes with which it may be used.

FIGURE 2 is a cross sectional view taken substantially along the line 2—2 of FIGURE 1.

FIGURE 3 is an illustration taken substantially along the line 3—3 of FIGURE 2 showing the catch release means, and FIGURE 4 is a further detail of the catch release means taken substantially along the line 4—4 of FIGURE 3.

In FIGURE 1 the thin-walled reactor tubes 10 are disposed in a tube sheet 12 suitably attached to a reactor shell 14 which has a lower end bracket 16 to which may be secured, by bolt means 18, the catalyst unloading machine bracket 20.

As previously indicated, in catalytic reactions of the type which employ solid particle types of catalysts, the catalyst particles 22, shown in the drawings as small balls inside each of the reactor tubes 10, need to be removed when replacement thereof is required. To effect this removal, an unloading machine or removing apparatus, generally designated 24, is employed. The machine 24 includes a mounting bracket 26 which has several depending pins, only one of which is illustrated and designated 28, that fit into respective apertures in bracket 20. Bracket 20 may be permanently mounted to the reactor tubes, so that the removing apparatus 24 need only be moved from one row to the next of tubes, without removing bracket 20. If desired, the entire removing device 24 may be mounted on a trolley wheel to permit ready movement of the device from one row of reactor tubes 10 to the next (not shown).

For each of the reactor tubes, there is a respective rodding means, preferably in the form of a flat flexible strip of metal 30, and a respective feeding mechanism 32. The feeding mechanism 32 may be best seen in detail by reference to FIGURE 2. This mechanism includes slide or bar 34 which has a plurality of serrated teeth 36 contacting a flat side of strip 30. Slidable bar 34 is biased into its downward, illustrated, position by spring 38 the compression of which is adjustable by threaded stud 40. Cooperating with a projection 42 on the front side of bar 34 is a cam 44 that has four equally spaced fingers or arms 46. This cam is rotated, in the direction indicated by the arrow, by motor 48 (FIGURE 1) through suitable gearing means 50 which turns shaft 52. Each time cam 44 rotates one revolution, bar 34 reciprocates four times due to the cooperating lifting action of the four fingers 46 and intervening downwardly biasing action of spring 38. This inches the metal strip 30 upwardly, for example one-half inch per stroke. The strip 30 is held upward by the pointed end of a pawl or catch 54 which prevents teeth 36 from pulling the strip back down when bar 34 is in the downward return portion of its cycle. Catch 54 is held from further counterclockwise rotation about its pivot point 56 by contact with surface 58, against which it is releasingly pressed by spring 60, the tension from which is adjustable via threaded stud 62.

As previously indicated, each of the rodding means or metal strips 30, which are fed into the respective reactor tubes, is preferably a flexible strip so that the thin walls of the reactor tubes cannot be damaged in case the upper ends of the metal strips become bent or otherwise tend to move into or scrape the walls themselves. If the amount of driving force required to push the catalyst particles out of any particular tube becomes so great that the upper end of the metal strip 30 would nevertheless tend to damage the reactor tube walls, then the feeding mechanism is designed to effect slip feeding; that is, in such a case, the bar 34 may move upward but the downward force on the metal strip 30 is greater than the frictional engagement force between teeth 36 and the strip. Therefore, bar 34 slidably urges its respective strip 30 into and through the reactor tube 10, to the extent possible.

Each of the flexible metal strips 30 has on its lower end any desirable type of stop mechanism, for example a transversely extending pin or, as illustrated, a hook 64, which abuts against a stop bar 66 when the strip is fully fed through the reactor tube, i.e., when the tube has been emptied. Due to various reasons, including relative ease of dislodging and removing the catalyst particles in one reactor tube as compared to another, some of the tubes will empty more readily than others, meaning that not all of the metal strips 30 will necessarily feed at the same rate regardless of the fact that all of the feeding devices 32 and their respective cams 44 operate off a common shaft 52.

When all of the tubes are empty and hooks 64 are against stop bar 66, all of the metal strips 30 may be pulled down and removed from the reactor tubes by manually or otherwise lowering stop bar 66 to effect this purpose, after catch 54 in each of the feeding devices 32 is released. To effect this release, shaft 56 about which each of the catches may pivot is rotated clockwise, considering the FIGURE 2 view, by an external handle 68 illustrated in FIGURES 1 and 3. As shown in FIGURE 4, each catch 54 has a pin 70, and shaft 56 has a cooperating pin 72 which engages pin 70 when shaft 56 is sufficiently rotated in the direction of arrow 74. Further rotation of shaft 56 in that same direction, now against the action of spring 60, releases the point edge 76 of catch 54 from metal strip 30. In normal feed operation, however, catch 54 may rotate about shaft 56 to the degree necessary without pins 70 and 72 becoming engaged, particularly since shaft 56 is biased by connection of spring 78 to handle 68 and the side of the feeding device 32, back to its predetermined position upon release of the handle.

As previously indicated, any number of feeding mechanisms 32 and metal strips 30 may be employed together in one over-all device as desired. For the purpose of changing the number of units, for example to accomodate a larger group of reactor tubes, additional feeding devices 32 may be conveniently added to the ends of shafts 52 and 56, (as is evident from FIGURE 1 the left two are added to the right one) giving the apparatus an "add-on" advantage.

As will be appreciated from the drawings, strips 30 have a breadth dimension considerably less than the diameter of tube 10, for example, one-half that dimension, and a thickness approximating one-fourth or less the diameter of tube 10. In effect, metal strips 30 may be referred to as "tapes" and as mentioned hereinabove, same are preferably flexible in nature. If the reactor tube diameters are large enough more than one flexible tape 30 may be employed for each reactor tube, using the same or a separate, slidable, serrated-toothed bar 34, for each tape 30. In any event, the rodding strips dislodge the catalyst particles 22 so that they quickly fall on down through the tubes. With multiple strips per tube, the rodding time may be reduced even more, leading to a greatly increased production time.

Thus, there has been illustrated and described apparatus which will accomplish all objects and advantages herein referred to, but limitation to the specific apparatus disclosed is not intended. Modifications thereof within the scope of this invention as measured by the appended claims will become apparent to those of ordinary skill in the art after reading this disclosure.

What is claimed is:

1. Apparatus for removing catalyst particles from at least one reactor tube comprising rodding means movable through said tube, and moving means for frictionally engaging and moving said rodding means through said tube except when the rodding means encounters some of said particles lodged in said tube sufficiently tight to present a counter force on the rodding means greater than the frictional engaging force between the said moving means and rodding means at which time said moving means slippingly moves relative to said rodding means to prevent overcoming the said counter force and thereby to prevent possible damage to the reactor tube walls by the rodding means.

2. Apparatus as in claim 1 wherein said rodding means includes a flexible rod having a transverse dimension substantially smaller than the corresponding dimension of said tube.

3. Apparatus as in claim 1 wherein said moving means includes a ratchet means having serrated teeth slipably operating against said rodding means to effect inching movement thereof through said tube except when pressure on the tube end of said rodding means becomes so great as to effect possible damage of said tube by said rodding means as aforesaid.

4. Apparatus as in claim 3 wherein said rodding means includes a flexible metal strip.

5. Apparatus as in claim 3 wherein said ratchet means includes means for moving said serrated teeth alternately in and and away from the direction of rodding means entry into said tube, and catch means operative on said rodding means to releasably prevent movement thereof out of said tube.

6. Apparatus as in claim 5 including means for releasing said catch means whereby said rodding means may be removed from said tube.

7. Apparatus as in claim 6 and further including means coupled to said rodding means for removing same from said tube when said catch means is released.

8. Apparatus as in claim 7 wherein said rodding means includes a flexible metal strip having its largest transverse dimension substantially smaller than the diameter of said tube.

9. Apparatus for removing solid particle type catalyst from each of a plurality of reactor tubes disposed in a row, comprising a plurality of flexible flat strips of metal, one for each of said tubes, a respective ratchet means for each of said strips, each ratchet means including a slidable rectilinear set of serrated teeth and rotatable means including biasing means for reciprocating said teeth frictionally against the respective metal strip and catch means for releasingly preventing each strip from movement in a direction away from its respective tube, motor means commonly coupled to said ratchet means to effect said reciprocations for moving each of said strips into and through a respective said tube, any of said teeth sets reciprocating slippingly relative to its respective strip when that strip encounters some of said catalyst particles lodged in said tube sufficiently tight to present to the strip a counter force greater than the frictional force between the respective set of teeth and strip to prevent overcoming said counter force and thereby to prevent possible damage to the reactor tube walls by said flat metal strips, means for releasing all of said catch means substantially simultaneously, and means for pulling each of said strips out of said tubes when said catch means are released.

References Cited in the file of this patent
UNITED STATES PATENTS 1,807,351     Supan _____ May 26, 1931
2,488,490     Buchmiller _____ Nov. 15, 1949